United States Patent
Williams et al.

(10) Patent No.: US 10,287,179 B2
(45) Date of Patent: May 14, 2019

(54) DRINKING WATER FILTRATION AND/OR PURIFICATION APPARATUS

(75) Inventors: Richard T. Williams, Glenmoore, PA (US); Carl Beiswenger, Pottstown, PA (US)

(73) Assignee: General Ecology, Inc., Exton, PA (US)

(*) Notice: Subject to any disclaimer, the term of this patent is extended or adjusted under 35 U.S.C. 154(b) by 0 days.

(21) Appl. No.: 13/346,499

(22) Filed: Jan. 9, 2012

(65) Prior Publication Data
US 2014/0374339 A1    Dec. 25, 2014

(51) Int. Cl.
*C02F 1/00* (2006.01)
*B01D 29/21* (2006.01)
*B01D 35/30* (2006.01)
*B01D 35/26* (2006.01)

(52) U.S. Cl.
CPC .............. *C02F 1/002* (2013.01); *B01D 29/21* (2013.01); *B01D 35/30* (2013.01); *B01D 35/26* (2013.01); *B01D 2201/295* (2013.01); *B01D 2201/304* (2013.01); *B01D 2201/347* (2013.01)

(58) Field of Classification Search
CPC ................................................ B01D 2201/295
See application file for complete search history.

(56) References Cited

U.S. PATENT DOCUMENTS

| 4,714,546 | A | | 12/1987 | Solomon et al. | |
|---|---|---|---|---|---|
| 5,558,762 | A | * | 9/1996 | Fife et al. | 210/130 |
| 5,569,374 | A | | 10/1996 | Williams | |
| 6,471,071 | B1 | * | 10/2002 | Shoaf | B01D 27/08 |
| | | | | | 210/440 |
| 7,081,201 | B2 | * | 7/2006 | Bassett et al. | 210/315 |
| 7,303,673 | B1 | * | 12/2007 | Glazewski | 210/232 |
| 2005/0144916 | A1 | * | 7/2005 | Adamek | B01D 29/21 |
| | | | | | 55/484 |
| 2006/0278575 | A1 | * | 12/2006 | Jokschas et al. | 210/493.1 |

OTHER PUBLICATIONS

International Preliminary Report on Patentability, PCT/US2013/020655.
International Search Report from PCT/US2013/020655.
Written Opinion of the International Searching Authority from PCT/US2013/020655.

* cited by examiner

*Primary Examiner* — Benjamin M Kurtz
(74) *Attorney, Agent, or Firm* — John F. A. Earley, III; Harding, Earley, Follmer & Frailey, P.C.

(57) ABSTRACT

An apparatus for filtering and/or purifying water preferably comprises a canister having filtration chamber formed therein and a matrix mounted in the filtration chamber for filtering and/or purifying water that passes through it. Shock absorbers preferably are provided for guarding against damage to the matrix if the apparatus is dropped. Preferably, the apparatus is provided with an inlet port to the filtration chamber, a first outlet port from the filtration chamber, and a second outlet port from the filtration chamber. Water may be pumped into the filtration chamber from the inlet port to wash away dirt and debris that may build up in the filtration chamber and then exit the filtration chamber with the dirt and debris via the second outlet port when open, thereby accomplishing removal of dirt and debris from the filtration chamber without having to backwash the apparatus for filtering and/or purifying water.

18 Claims, 7 Drawing Sheets

DRINKING WATER FILTRATION AND/OR PURIFICATION APPARATUS

FIELD OF THE INVENTION

This invention relates to filtration and/or purification of water, and more particularly concerns apparatuses for filtering and/or purifying water obtained from an unpurified water source, such as, for example, from a stream by a camper on a camping trip.

BACKGROUND OF THE INVENTION

Apparatuses for filtering and/or purifying water, which have a housing or canister having a filtration chamber formed therein and a filtration device, such as a filtration matrix or a microfiltration matrix, mounted in the filtration chamber for filtering and/or purifying the water passing through it, are known. Water to be filtered and/or purified may be pumped into the filtration chamber of such apparatuses where the water may pass through the filtration device mounted in the filtration chamber to filter and/or purify the water. After passing through the filtration device, which results in filtering and/or purifying the water, the water which has been filtered and/or purified may exit the apparatus through an outlet port. Typically, in such apparatuses, the filtration device divides the filtration chamber into two zones, a first zone for receiving water to be filtered and/or purified and a second zone for receiving water that has been filtered and/or purified by moving from the first zone into the second zone by passing through the filtration device. The second zone is in fluid communication with the outlet port from the housing or canister from which the water that has been filtered and/or purified exits the apparatus for filtering and/or purifying water. An example of one such apparatus is manufactured and sold by General Ecology, Inc., of Exton, Pa., under the trademark FIRST NEED, which has been well received in the marketplace as being very effective in providing potable water.

Due to the nature of the filtration device in such apparatuses, appropriate care should be taken to avoid dropping such apparatuses. If such apparatuses are dropped from too high of a height onto a hard surface, the filtration device may be damaged, thereby creating a pathway through the filtration device for untreated water to pass without being filtered and/or purified.

During use of apparatuses like General Ecology's FIRST NEED apparatus for filtering and/or purifying water, dirt and debris contained in the water to be filtered and/or purified tends to build up in the first zone of the filtration chamber on the surface of the filtration device facing the first zone of the filtration chamber, as well as in the first zone of the filtration chamber between the wall of the filtration chamber in the first zone and the filtration device. Currently, to remove such dirt and debris that builds up on the filtration device in the first zone of the filtration chamber and that builds up in the first zone of the filtration chamber between the walls of the filtration chamber and the filtration device, such apparatuses are backwashed. That is, purified water is pumped in a reversed direction through the apparatus for filtering and/or purifying water to remove dirt and debris built up on the surface of the filtration device in the first zone of the filtration chamber and built up in the first zone of the filtration chamber between the wall of the filtration chamber and the filtration device. Specifically, when backwashing, water is pumped into and through the outlet port into the second zone of the filtration chamber, then from the second zone of the filtration chamber through the filtration device into the first zone of the filtration chamber that receives the water to be filtered and/or purified when the apparatus is being used to filter and/or purify water, and then from the first zone of the filtration chamber through the inlet port of the apparatus to exit the apparatus taking with it the dirt and debris that had built up in the apparatus. A drawback with such backwashing is that it creates a risk of damaging the filtration device since pumping water too hard in a reverse direction of flow through the filtration device (e.g., through the filtration device from the second zone of the filtration chamber into the first zone of the filtration chamber) may damage the filtration device. Moreover, if water that has not been filtered and purified is used to backwash the apparatus for filtering and/or purifying water, the backwash procedure places water that has not been filtered and/or purified in the second zone of the filtration chamber and outlet port of the apparatus, which is undesirable.

SUMMARY OF THE INVENTION

It is an object of the invention to provide an apparatus for filtering and/or purifying water that reduces the chances of damage to the filtration device mounted therein if the apparatus for filtering and/or purifying water is dropped.

Another object of the invention is to provide an apparatus for filtering and/or purifying water, in which dirt and debris contained in the water to be filtering and/or purified that builds up on the surface of the filtration device in the first zone of the filtration chamber of the apparatus and that builds up in the first zone of the filtration chamber of the apparatus between the wall of the of the filtration chamber and the filtrating device may be removed without having to backwash through the filtration device.

These and other objects are accomplished by the invention which is set out below.

DETAILED DESCRIPTION

Turning now to the drawings, there is shown the inventive apparatus 11 for filtering and/or purifying water. (Generally purification relates to protecting against waterborne enteric pathogens, and in the United States is generally defined by EPA regulations which require performance meeting the EPA Guide Standard and Protocol for Microbiological Purifiers. Filtration may be almost anything else that is useful, such as taste and odor removal, scale control, etc.) Referring to FIGS. 1-8, apparatus 11, in a preferred embodiment of the invention, has a housing 13 having a filtration chamber 15 formed therein in which a filtration device, such as a matrix apparatus 17, is mounted for filtering and/or purifying water passing through the matrix apparatus 17.

Preferably, the housing 13 comprises a cover 19 and a bowl 21. Preferably, the cover 19 has an end wall 23, a side wall 25 extending away from the end wall 23, and a rim 27 formed on the end of the side wall 25, and the bowl 19 has an end wall 29, a side wall 31 extending away from the end wall 29, and a rim 33 formed on the end of the side wall 31. The cover 19 and the bowl 21 preferably are made from a polymeric material, such as polypropylene. Depending on the specific requirements of the apparatus 11, other polymers, such as acetal, ABS, or polysulfone, may be used to form the cover 19 and the bowl 21. After the matrix apparatus 17 is positioned in the cover 19 and the bowl 21, the cover 19 and the bowl 21 are joined together along their respective rims 27 and 33, preferably by spin welding, to form the housing 13.

In the embodiment of the invention illustrated in FIGS. 1-13, the housing 13 has an inlet port 35 formed therein through which water to be filtered and/or purified may flow into the filtration chamber 15. Preferably, the inlet port 35 is formed in the end wall 23 of the cover 19 by a hollow stem 37 preferably integrally formed in the end wall 23 of the cover 19. Preferably, a hollow extension stem 38 is mounted on the hollow stem 37 to facilitate connecting the inlet port 35 to a pumping apparatus (not shown) used to pump water to be filtered and/or purified into the apparatus 11.

In the embodiment of the invention illustrated in FIGS. 1-13, the housing 13 has a first outlet port 39 formed therein through which water that has been filtered and/or purified in the filtration chamber 15 may flow from the filtration chamber 15 and exit the apparatus 11. Preferably, the first outlet port 39 is integrally formed in the end wall 29 of the bowl 21 by a hollow stem 41 that has a first portion 43 that extends inwardly from the end wall 29 of the bowl 21 into the filtration chamber 15 and a second portion 45 that extends outwardly from the end wall 29 of the bowl 21.

The matrix apparatus 17 preferably has a cylindrical matrix 47 having a first end portion 49, a second end portion 51, an outer side surface 53 extending between a first end portion 49 of the matrix 47 and the second end portion 51 of the matrix 47, and a cylindrical channel 55 extending through the matrix 47 along the center axis of the matrix 47. The first portion 43 of the hollow stem 41 of the first outlet port 39 extends into the cylindrical channel 55, thereby placing the cylindrical channel 55 in fluid communication with the first outlet port 39.

Preferably, the matrix 47 is a microfiltration matrix that has a 0.1 micron (0.4 absolute) to a 10 micron retention for removing chemical, microbiological, and fine particulate contamination. Also, preferably, the outer side surface 53 of the matrix 47 has a pleated or crenellated structure, formed from a plurality of ridges 56 formed thereon that extend between the first and second end portions 49 and 51 of the matrix 47. Preferably, the matrix 47 is formed from filtration media for filtering and/or purifying water.

The filtration device, of which the matrix apparatus 17 is an example, may have a structure other than the structure of the cylindrical matrix apparatus 17 described above. For example, the filtration device may take the form of a disk or a block. However, whatever structure the filtration device takes, the filtration device, in preferred embodiments of the invention, divides the filtration chamber (e.g., filtration chamber 15) formed in the housing or canister (e.g., housing 13) of the inventive apparatus for filtering and/or purifying water (e.g., apparatus 11) into two zones, which comprise a first zone for receiving water to be filtered and/or purified entering the filtration chamber (e.g., filtration chamber 15) via the inlet port (e.g., inlet port 35) of the inventive apparatus for filtering and/or purifying water (e.g., apparatus 11), and a second zone for receiving water that has been filtered and/or purified by moving from the first zone into the second zone by passing through the filtration device. In the embodiment of the invention illustrated in the drawings, and particularly shown in FIGS. 3 and 7, the filtration device is exemplified by the matrix apparatus 17, the first zone of the filtration chamber 15 is indicated with reference number 58, and the second zone of the filtration chamber 15 is indicated with reference number 60. Water entering the inventive apparatus for filtering and/or purifying water (e.g., apparatus 11) from the inlet port (e.g., inlet port 35) of the inventive apparatus for filtering and/or purifying water (e.g., apparatus 11) may only enter into the second zone 60 by passing through the filtration device (e.g., the matrix apparatus 17 of apparatus 11). The second zone 60 is in fluid communication with the outlet port (e.g., outlet port 39) form which the water that has been filtered and/or purified exits the inventive apparatus for filtering and/or purifying water (e.g., apparatus 11).

Figure 1:
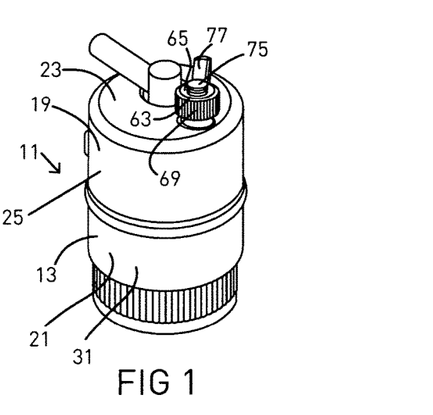
FIG. 1 is a view in perspective of an apparatus for filtering and/or purifying water, constructed in accordance with the invention.
Figure 2:
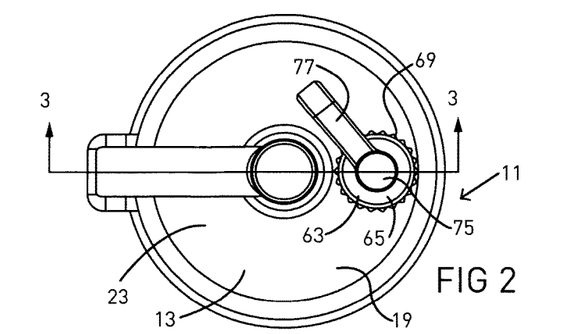
FIG. 2 is a view in top plan of the apparatus for filtering and/or purifying water shown in FIG. 1.
Figure 3:
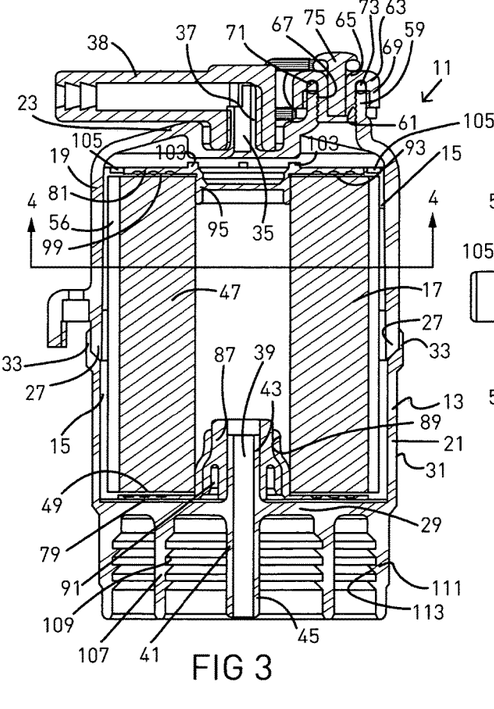
FIG. 3 is a view in cross-section taken along the lines and arrows 3-3 shown in FIG. 2.
Figure 4:
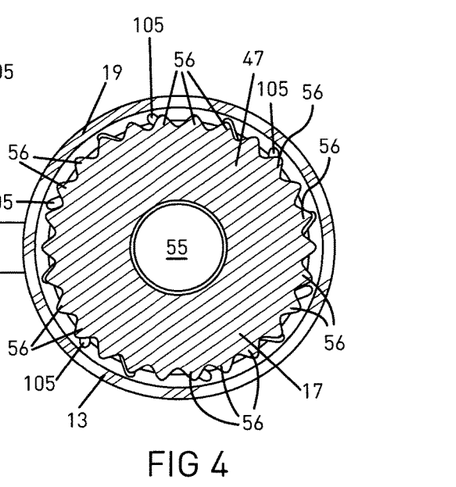
FIG. 4 is a view in cross-section taken along the lines and arrows 4-4 shown in FIG. 3.
Figure 5:
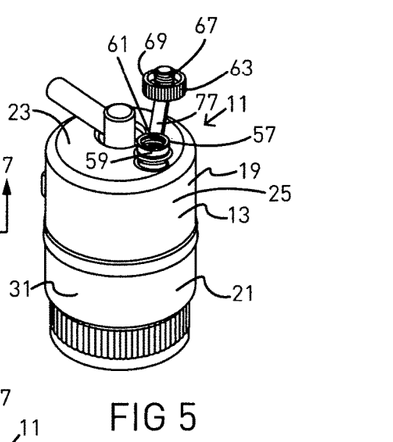
FIG. 5 is a view in perspective of the apparatus for filtering and/or purifying water shown in FIG. 1, except a removable cap 63 has been unscrewed from a second outlet port 57.
Figure 6:
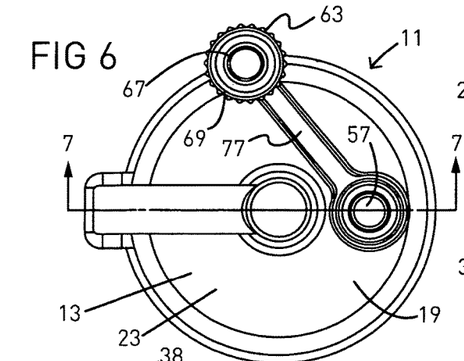
FIG. 6 is a view in top plan of the apparatus for filtering and/or purifying water shown in FIG. 5.

Preferably, the housing 13 also has a second outlet port 57 formed therein through which water entering into the filtration chamber 15 from the inlet port 35 may flow from the filtration chamber 15 without having to first flow through the matrix 47. Preferably, the second outlet port 57 is integrally formed in the end wall 23 of the cover 19 by a hollow stem 59. Preferably, the hollow stem 59 is provided with internal threading 61 onto which a closure member, preferably a threaded removable cap 63, may be screwed for closing the second outlet port 57 when desired. Preferably, the removable cap 63 has a top wall 65 and a cylindrical threaded stub portion 67 that extends downwardly from the top wall 65 and engages the threading 61 formed on the hollow stem 59 when the removable cap 63 is screwed onto the hollow stem 59 to close the second outlet port 57. Also, the removable cap 63 preferably has a cylindrical apron 69 formed at the periphery of the top wall 65 and extending downwardly from the top wall 65 of the removable cap 63 for surrounding the outside of the hollow stem 59 when the removable cap 63 is screwed onto the hollow stem 59. Further, as seen in FIG. 3, preferably, a annular recess 71 is formed in the top wall 65 of the removable cap 63 between the cylindrical apron 69 and the cylindrical threaded stub portion 67 for receiving a sealing member 73, such as an o-ring, for sealing between the removable cap 63 and the hollow stem 59 when the removable cap 63 is screwed on to the hollow stem 59 to close the second outlet portion 57. Also, a retaining pin 75 preferably is adhered to the removable cap 63 to secure a first portion of a strap 77 (preferably made of a polymeric material or rubber) to the removable cap 63. The second end of the strap 77 preferably is frictionally mounted around the outside of the hollow stem 59 so that the removable cap 63 is not lost when it is unscrewed from the second outlet port 57. Preferably, the removable cap 63 and the retaining pin 75 are made of a polymeric material.

Preferably, the matrix apparatus 17 has a first end cap 79, which is secured to the first end portion 49 of the matrix 47, and a second end cap 81, which is secured to the second end portion 51 of the matrix 47. The first and second end caps 79 and 81 preferably are made of a polymeric material.

The first end cap 79 preferably has a disk portion 83 and a hollow cylindrical center ring 85 formed on the disk portion 83. The disk portion 83 preferably is bonded to the first end portion 49 of the matrix 47 to secure the first end cap 79 to the matrix 47, and the hollow cylindrical ring 85 extends into the cylindrical channel 55 and surrounds the first portion 43 of the hollow stem 41 that forms the first outlet port 39.

Figure 7:
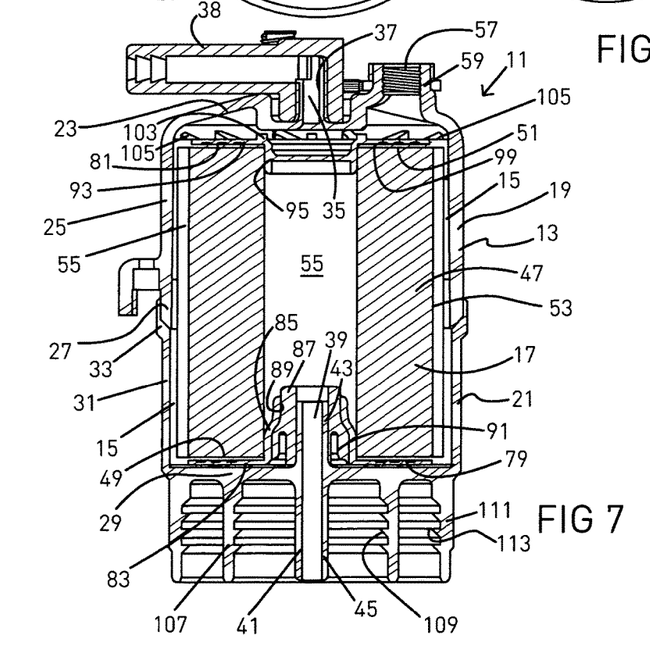
FIG. 7 is a view in cross-section taken along the lines and arrows 7-7 shown in FIG. 6.
Figure 8:
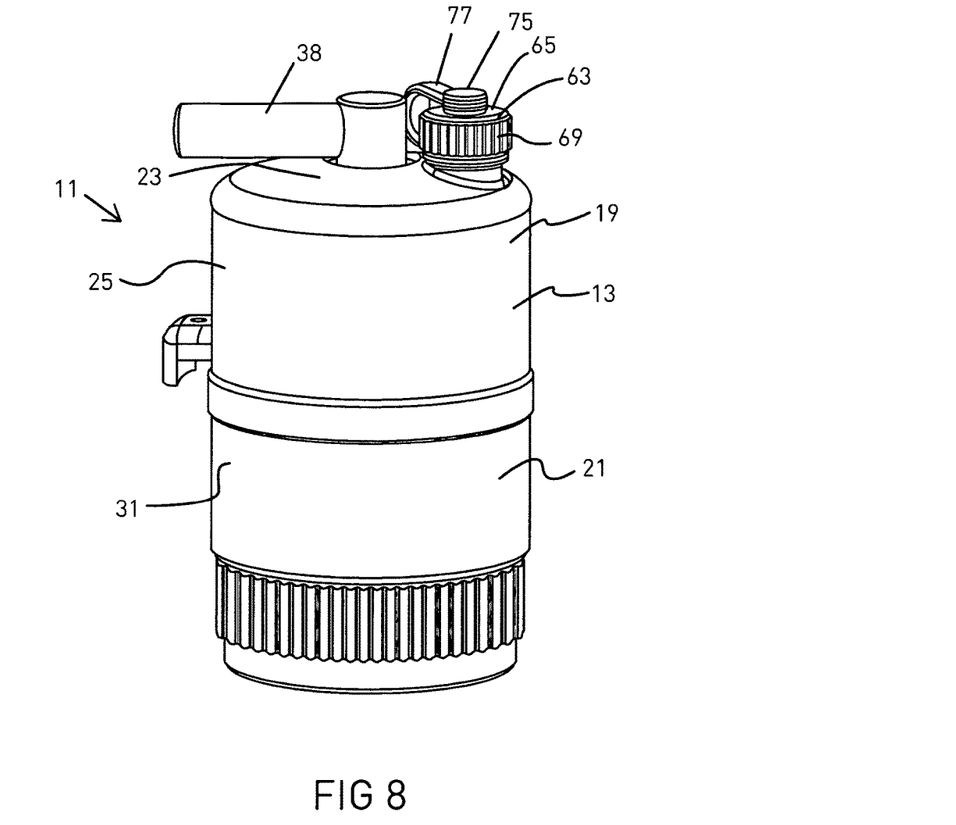
FIG. 8 is another view in perspective of the apparatus for filtering and/or purifying water shown in FIG. 1.
Figure 9:
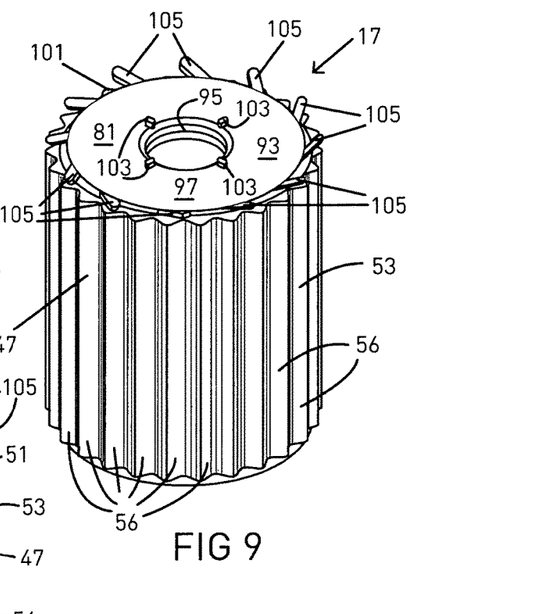
FIG. 9 is a view in perspective of a matrix apparatus for filtering and/or purifying water, constructed in accordance with the invention.
Figure 10:
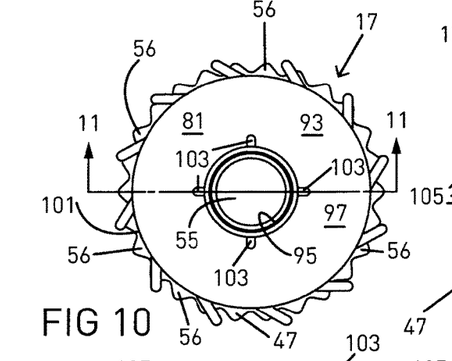
FIG. 10 is a view in top plan of the matrix apparatus for filtering and/or purifying water shown in FIG. 9.
Figure 11:
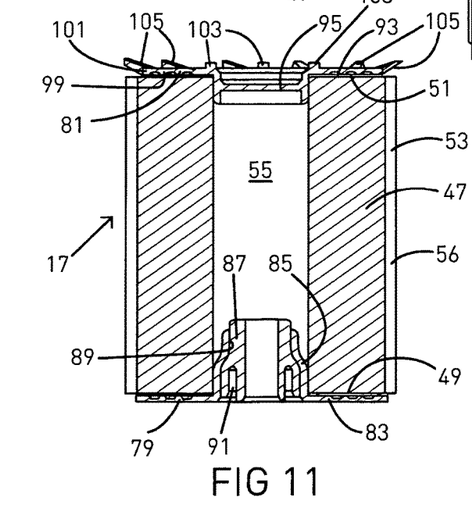
FIG. 11 is a view in cross-section taken along the lines and arrows 11-11 shown in FIG. 10.
Figure 12:
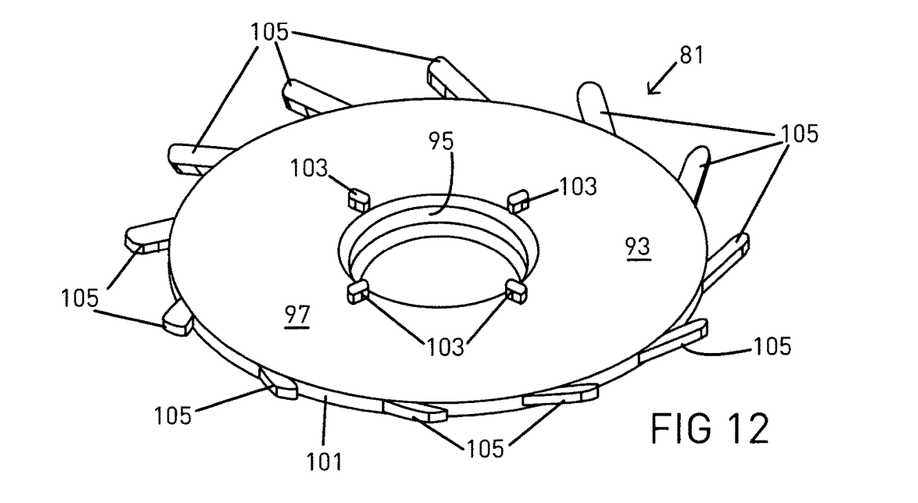
FIG. 12 is a view in perspective of a second end cap 81, constructed in accordance with the invention.
Figure 13:
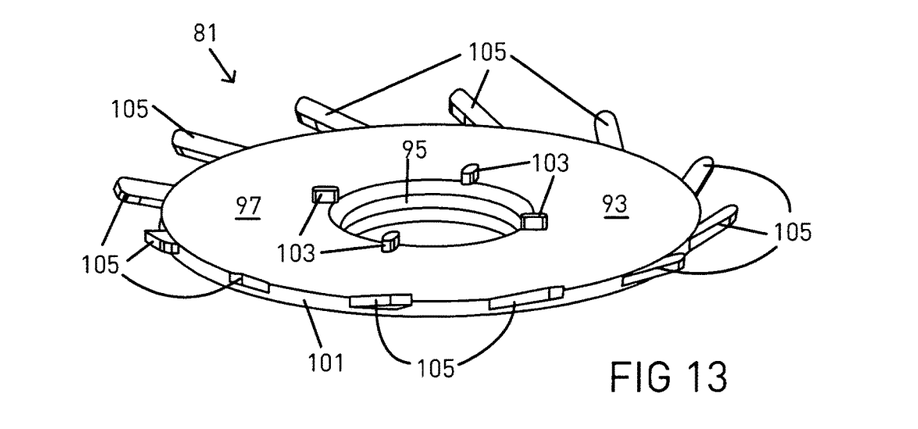
FIG. 13 is another view in perspective of the second end cap 81 shown in FIG. 12.
Figure 14:
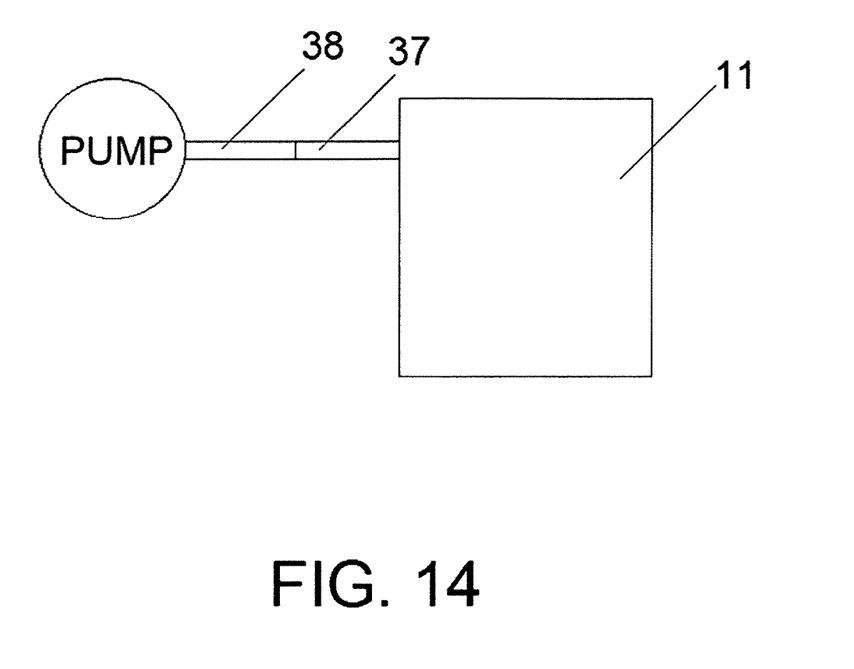
FIG. 14 is a schematic view of the inventive apparatus having a pumping apparatus.
Figure 15:
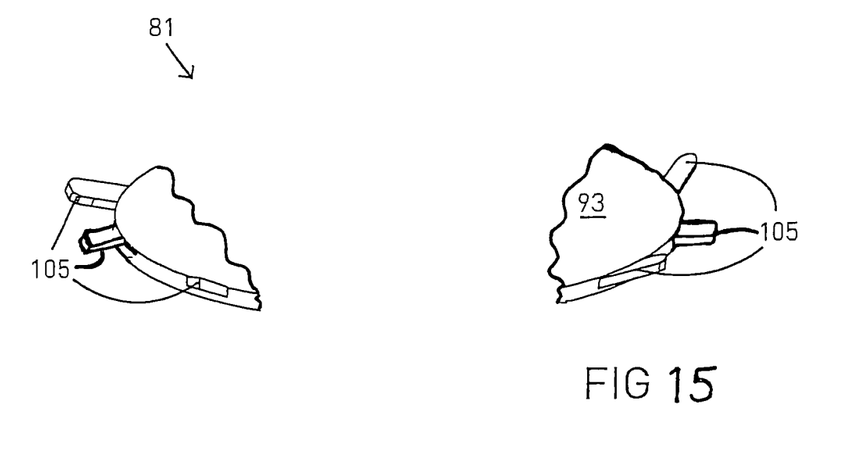
FIG. 15 is a partial view in perspective of a second end cap 81 that has some resilient fingers 105 that project radially away from the matrix 47 along a plane containing the disk portion 93 of the second end cap 81 and some resilient fingers 105 that extend outwardly from the disk portion 93 of the second end cap 81 at an angle above the plane of the disk portion 93 of the second end cap 81.

Preferably, as seen in FIGS. 3 and 7, the matrix apparatus 17 also has a resilient shock absorbing ring 87 for guarding against damage to the matrix 47 if the apparatus 11 for filtering and/or purifying water is dropped. Preferably, the resilient shock absorbing ring 87 is made of a resilient polymer or rubber, and is mounted (preferably by frictionally mounting or by using an elastomeric adhesive) on and between the hollow cylindrical center ring 85 and the first portion 43 of the hollow stem 41 that forms the first outlet port 39. The resilient shock absorbing ring 87, in addition to absorbing shock forces that may be placed on the matrix 47 if the apparatus 11 is dropped, acts as a sealing member to provide a water tight seal between the hollow cylindrical ring 85 of the first end cap 79 and the first portion 43 of the hollow stem 41 that forms the first outlet port 39. Preferably, the hollow cylindrical ring 85 is provided with a pressure riser 89 integrally formed thereon that cuts into the resilient shock absorbing ring 87 to aid in mounting shock absorbing ring 87 in place in a sealing manner between the hollow cylindrical ring 85 of the first end cap 79 and the first portion 43 of the hollow stem 41 that forms the first outlet port 39. Also, preferably, the resilient shock absorbing ring 87 has an annular recess 91 formed therein for increasing the ability of the resilient shock absorbing ring 87 to absorb shock forces created if the apparatus 11 is dropped.

The second end cap 81 of the matrix apparatus 17 preferably has a disk portion 93 and a cylindrical center stub 95 formed on the disk portion 93. The disk portion 93 has a top surface 97, a bottom surface 99, and a periphery 101. The bottom surface 99 of the disk portion 93 of the second end cap 81 preferably is bonded to the second end portion 51 of the matrix 47 to secure the second end cap 81 to the matrix 47, and the cylindrical center stub 95 extends into the cylindrical channel 55 extending through the matrix 47. Spacing members 103 preferably are formed on the top surface 97 of the disk portion 93 for preventing the top surface 97 of the disk portion 93 from contacting the end wall 23 of the cover 19, thereby creating space between the top surface 97 of the disk portion 93 and the end wall 23 of the cover 19 for water entering the filtration chamber 15 to flow. A plurality of resilient springy fingers 105 preferably are formed on the periphery 101 of the disk portion 93 and project toward portions of the cover 19 near the periphery 101 of the disk portion 93 of the second end cap 81. Preferably, some of the fingers 105 extend outwardly from the disk portion 93 of the second end cap and at an angle above the plane of the disk portion 93 of the second end cap 81. The fingers 105 act as shock absorbers for the matrix apparatus 17 to guard against damage to the matrix 47 if the apparatus 11 for filtering and/or purifying water is dropped. The fingers 105 preferably are integrally formed in the second end cap 81.

Preferably, a first bottle connection means is formed on the end wall 29 of the bowl 21 of the housing 13 and surrounds the second portion 45 of the hollow stem 41 of the first outlet port 39 for connecting the apparatus 11 to a mouth of a bottle to permit water that has been filtered and/or purified in the apparatus 11 to flow from the first outlet port 39 into the bottle. The first bottle connection means preferably comprises a first annular ring 107 that is integral with the end wall 29 of the bowl 21 of the housing 13 and that extends away from the end wall 29 and surrounds the second portion of the hollow stem 41 of the first outlet port 39. The first annular, ring 107 is provided with threading 109 on the inner surface of the first annular ring 107 for receiving matching threading formed on the outside surface of the mouth of the bottle when the bottle is screwed onto the first annular ring 107.

A second bottle connection means preferably also is formed on the end wall 29 of the bowl 21 of the housing 13 and surrounds the second portion 45 of the hollow stem 41 of the first outlet port 39, as well as the first annular ring 107, for connecting the apparatus 11 to a mouth of a bottle having a wider mouth size than the mouth of the bottle sized to screw onto the first annular ring 107 to permit water that has been filtered and/or purified in the apparatus 11 to flow from the first outlet port 39 into the bottle having the wider mouth. The second bottle connection means preferably comprises a second annular ring 111 that is integral with the end wall 29 of the bowl 21 of the housing 13 and that extends away from the end wall 29 and surrounds the second portion 45 of the hollow stem 41 of the first outlet port 39 and the first annular ring 107. The second annular ring 111 is similar in structure to the first annular ring 107, except that the diameter of the second annular ring 111 is wider than the diameter of the first annular ring 107. The second annular ring 111 is provided with threading 113 on the inner surface of the second annular ring 111 for receiving matching threading formed on the outside surface of the wider mouth bottle when the bottle is screwed onto the second annular ring 111.

The apparatus 11 may be operated as follows. If it is desired to filter and/or purify water, such as water from a stream when camping, the removable cap 63 is first screwed onto the hollow stem 59 to close the second outlet port 57. Then, water to be filtered and/or purified may be pumped from a pumping apparatus that has been connected to the extension stem 38 to and through the inlet port 35 formed by the combination of the hollow stem 37 and the extension stem 38 into the filtration chamber 15, along the outside of the matrix apparatus 17, through the matrix 47 (to filter and/or purify the water) into the cylindrical channel 55 extending through the matrix 47, and to and through the first outlet port 39 formed by the hollow stem 41, to preferably a container for collecting the water that has been filtered and/or purified by the apparatus 11. If it is desired to have water that has been filtered and/or purified by the apparatus 11 pumped directly into a bottle from the apparatus 11, the bottle preferably is first screwed onto the first annular ring 107 if the bottle has a mouth size that matches the diameter of the first annular ring 107 or the bottle preferably is first screwed onto the second annular ring 111 if the bottle has a mouth size that matches the diameter of the second annular ring 111.

When it is desired to wash away dirt and debris that was contained in the water to be filtered and/or purified and has settled on the outer surface 53 of the matrix 47 and/or between the outer surface 53 of the matrix 47 and the housing 13 in the filtration chamber 15, the removable cap 63 is removed from over the second outlet port 57 by unscrewing the removable cap 63 from the threaded hollow stem 59 to open the second outlet port 57, the apparatus 11 preferably is turned upside down such that the second outlet port 57 faces the ground, and water is pumped from pumping apparatus that has been connected to the extension stem 38 to and through the inlet port 35 formed by the combination of the hollow stem 37 and the extension stem 38 into the filtration chamber 15, along the outside of the matrix apparatus 17, including over the outer surface 53 of the matrix 47, and between the matrix apparatus 17 and the surface portions of the housing 13 defining the filtration chamber 15, and to and through the second outlet port 57 formed by the hollow stem 59 to wash dirt and debris that has settled on the outer surface 53 of the matrix 47 and/or between the outer surface 53 of the matrix 47 and the surface portions of the housing 13 defining the filtration chamber 15 from the filtration chamber 15. It is believed that when the outer surface 53 of the matrix 47 is pleated, as shown in the drawings, the washing away of dirt and debris from the filtration chamber 15 as described above is facilitated since the pleated outer surface 53 creates more clearance space between the surface portions of the housing defining the filtration chamber 15 and the outer surface 53 of the matrix 47 due to the space between adjacent ridges 56 on the outer surface 53 of the matrix 47, thereby permitting a greater amount of water to simultaneously flow over the outer surface 53 of the matrix 47 and between the outer surface 53 of the matrix 47 and the surface portions of the housing 13 defining the filtration chamber 15, as compared to cylindrical matrices which have a circular outer cross-section and which may be slotted.

In the preferred embodiment of the invention shown in the drawings, the apparatus 11 is portable, affordable, easy to use, lightweight, and compact. Since the apparatus 11 of the invention is small and portable, it may be used by a camper to filter and/or purify water obtained from streams and rivers, and it may be stored in the camper's backpack when not in use. The apparatus 11 of the invention preferably is sized to be small enough to be carried in a backpack, a suitcase, a briefcase, or the like. A traveler may carry the portable drinking water apparatus 11 in a backpack, or a suitcase, or a briefcase, or the like when travelling to places where local tap water is not purified, and the local unpurified water may be purified quickly with the apparatus 11 of the invention.

What is claimed is:

1. An apparatus for filtering and/or purifying water, comprising
   a housing having a filtration chamber formed therein, the housing having a top wall and a bottom wall,
   an inlet port formed in the top wall of the housing through which water to be filtered and/or purified may flow into the filtration chamber,
   first water outlet means formed in the bottom wall of the housing for discharging water filtered and/or purified in the filtration chamber from the filtration chamber,
   a matrix apparatus mounted in the filtration chamber for filtering and/or purifying water passing through the matrix apparatus,
   the matrix apparatus comprising a cylindrical matrix having a first end portion, a second end portion, a cylindrically shaped portion extending from the first end portion of the matrix to the second end portion of the matrix, a center axis extending between the first end portion of the matrix and the second end portion of the matrix, and a channel extending through the matrix along the center axis of the matrix,
   the matrix having an outer surface and an outer periphery, the outer surface of the matrix having a crenellated structure, the outer surface of the matrix extending only along the outer periphery of the matrix,
   the entire outer surface of the matrix facing substantially radially outwardly away from the center axis extending through the matrix,
   the crenellated structure being formed by a plurality of ridges on the outer surface of the matrix, the ridges extending between the first end portion of the matrix and the second end portion of the matrix,
   the outer periphery of the matrix being configured such that a line extending outwardly away from any portion of the outer surface of the matrix between the ridges at an angle that is substantially perpendicular to the outer surface of the matrix at said portion does not intersect another portion of the outer surface of the matrix,
   the channel extending through the matrix being in fluid communication with the first water outlet means,
   second water outlet means formed in the top wall of the housing and open when desired during pumping of water into the filtration chamber via the inlet port for discharging from the filtration chamber without having to first flow through the matrix water that has entered into the filtration chamber from the inlet port and flowed over the outer surface of the matrix apparatus and between the outer surface of the matrix apparatus and the housing to remove dirt and debris on the outer surface of the matrix apparatus and/or between the outer surface of the matrix apparatus and the housing from the filtration chamber, and
   a pumping apparatus adapted to be connected to the inlet port and to a stream, a river, or water from a tap,
   wherein the apparatus has opposite ends including a first end and a second end, wherein said first water outlet means is disposed on an end of the apparatus that is opposite to an end of the apparatus at which said second water outlet means is disposed, and
   wherein the apparatus is portable and is sized such that it may be carried in a backpack, a suitcase, or a briefcase.

2. The apparatus of claim 1, the matrix being a microfiltration matrix.

3. The apparatus of claim 1, including a bottle connection area located at the first water outlet means of the apparatus and including first bottle connection means for connecting the apparatus to a first sized bottle and including second bottle connection means for connecting the apparatus to a second sized bottle.

4. The apparatus of claim 1, wherein said inlet port has a stem leading thereto, and wherein said pumping apparatus is connected to said stem.

5. The apparatus of claim 1,
  said second water outlet means including a removable cap that may be removed from the second water outlet means to open the second outlet means.
6. An apparatus for filtering and/or purifying water, comprising
  a housing having a filtration chamber formed therein,
  the housing having a top wall and a bottom wall,
  an inlet port formed in the top wall of the housing through which water to be filtered and/or purified may flow into the filtration chamber,
  first water outlet means formed in the bottom wall of the housing for discharging water filtered and/or purified in the filtration chamber from the filtration chamber,
  a matrix apparatus mounted in the filtration chamber for filtering and/or purifying water passing through the matrix apparatus,
  the matrix apparatus comprising a cylindrical matrix having a first end portion, a second end portion, a cylindrically shaped portion extending from the first end portion of the matrix to the second end portion of the matrix, a center axis extending between the first end portion of the matrix and the second end portion of the matrix, a channel extending through the matrix along the center axis of the matrix, and an outer surface,
  the channel extending through the matrix being in fluid communication with the first water outlet means,
  second water outlet means formed in the top wall of the housing and open when desired during pumping of water into the filtration chamber via the inlet port for discharging from the filtration chamber without having to first flow through the matrix water that has entered into the filtration chamber from the inlet port and flowed over the outer surface of the matrix apparatus and between the outer surface of the matrix apparatus and the housing to remove dirt and debris on the outer surface of the matrix apparatus and/or between the outer surface of the matrix apparatus and the housing from the filtration chamber, and
  a pumping apparatus connected to the inlet port and to a stream, a river, or water from a tap,
  wherein the apparatus has opposite ends including a first end and a second end, wherein said first water outlet means is disposed on an end of the apparatus that is opposite to an end of the apparatus at which said second water outlet means is disposed, and
  wherein the apparatus is portable and is sized such that it may be carried in a backpack, a suitcase, or a briefcase,
  the first water outlet means being formed by a hollow stem formed in the housing, the hollow stem forming a passageway through which water exits the housing after being filtered and/or purified, the hollow stem having a portion that extends into the channel extending through the matrix,
  the matrix apparatus having a first end cap secured to the first end portion of the matrix,
  the first end cap having a disk portion and a hollow cylindrical center ring formed on the disk portion that extends into the channel extending through the matrix, the disk portion engaging the first end portion of the matrix, and the hollow cylindrical center ring surrounding the portion of the hollow stem extending into the channel extending through the matrix, and further including
  a resilient shock absorbing ring extending into the channel extending through the matrix snugly mounted between and in contact with both the portion of the hollow stem extending into the channel extending through the matrix and the hollow cylindrical center ring formed on the disk portion of the first end cap for guarding against damage to the matrix if the apparatus for filtering and/or purifying water is dropped,
  the resilient shock absorbing ring having an annular recess formed therein to increase shock absorbing ability of the resilient shock absorbing ring, the annular recess being closed off from flow of water from the channel extending through the matrix.
7. The apparatus of claim 6,
  the matrix apparatus having a second end cap secured to the second end portion of the matrix,
  the second end cap having a disk portion, the disk portion having a top surface, a bottom surface, and a periphery, the bottom surface of the disk portion being secured to the second end portion of the matrix, and
  the second end cap further including
  shock absorbing means formed on the periphery of the disk portion of the end second cap and projecting toward portions of the housing near the periphery of the disk portion of the second end cap for absorbing shock to the matrix apparatus to guard against damage to the matrix if the apparatus for filtering and/or purifying water is dropped.
8. The apparatus of claim 6,
  the matrix apparatus having a second end cap secured to the second end portion of the matrix,
  the second end cap having a disk portion, the disk portion having a top surface, a bottom surface, and a peripheral edge, the bottom surface of the disk portion being secured to the second end portion of the matrix, and
  the second end cap further including
  a plurality of resilient fingers integrally formed on the peripheral edge of the disk portion of the second end cap and projecting toward portions of the housing near the periphery of the disk portion of the second end cap,
  the resilient fingers acting as shock absorbers for the matrix apparatus to guard against damage to the matrix if the apparatus for filtering and/or purifying water is dropped;
  wherein some of the resilient fingers project radially away from the matrix along a plane containing the disk portion of the second end cap and some of the resilient fingers extend outwardly from the disk portion of the end cap at an angle above the plane of the disk portion of the second end cap.
9. The apparatus of claim 8,
  the cylindrically shaped portion of the matrix apparatus having an integral crenellated outer surface, the outer surface being formed from a plurality of ridges formed thereon that extend between the first end portion of the matrix and the second end portion of the matrix, the outer surface between the ridges not being interrupted by any gaps therein.
10. An apparatus for filtering and/or purifying water, comprising
  a housing,
  a filtration chamber formed in the housing,
  an inlet port through which water to be filtered and/or purified may flow into the filtration chamber,
  an outlet port through which water filtered and/or purified in the filtration chamber may flow from the filtration chamber, the outlet port including a hollow stem formed on the housing, a matrix apparatus mounted in the filtration chamber for filtering and/or purifying water passing through the matrix apparatus, the matrix apparatus comprising a matrix having a first end portion and a second end portion, the matrix apparatus dividing the filtration chamber into two zones which comprise a first zone for receiving water to be filtered and/or purified entering the filtration chamber via the inlet port and a second zone for receiving water that has been filtered and/or purified by moving from the first zone into the second zone by passing through the matrix apparatus, the second zone of the filtration chamber being in fluid communication with the outlet port, the hollow stem of the outlet port having a portion that extends into the second zone, the matrix apparatus having a first end cap secured to the first end portion of the matrix, the first end cap having a disk portion and a hollow cylindrical ring formed on the disk portion that extends into the second zone, the disk portion engaging the first end portion of the matrix, and the hollow cylindrical ring surrounding a portion of the hollow stem that extends into the second zone, and a resilient shock absorbing member extending into the second zone and snugly mounted between and in contact with both the portion of the hollow stem that extends into the second zone and the hollow cylindrical ring formed on the disk portion of the first end cap for guarding against damage to the matrix if the apparatus for filtering and/or purifying water is dropped, the resilient shock absorbing ring having an annular recess formed therein to increase shock absorbing ability of the resilient shock absorbing ring, the annular recess being located between the portion of the hollow stem that extends into the second zone and the hollow cylindrical ring formed on the disk portion of the first end cap, and the annular recess being closed off from flow of water from the second zone of the filtration chamber.

11. The apparatus of claim 10, the matrix apparatus having a second end cap secured to the second end portion of the matrix, the second end cap having a disk portion, the disk portion of the second end cap having a periphery, and the second end cap including shock absorbing means formed on the periphery of the disk portion of the second end cap that project toward portions of the housing near the periphery of the disk portion of the second end cap for absorbing shock to the matrix apparatus to guard against damage to the matrix if the apparatus for filtering and/or purifying water is dropped, wherein the shock absorbing means projecting toward portions of the housing includes resilient springy fingers that project radially away from the matrix along a plane containing the disk portion of the second end cap and resilient springy fingers that extend outwardly from the disk portion of the second end cap at an angle above the plane of the disk portion of the second end cap.

12. The apparatus of claim 10, wherein said housing includes an upper housing part and a lower housing part;

wherein said lower housing part has a side wall that is an outer wall that forms an exterior of said apparatus;

wherein said lower housing part includes an inner wall forming said hollow stem;

wherein said resilient ring is disposed about said hollow stem;

wherein said hollow stem has a height that extends into the second zone; and wherein said lower housing part side wall extends upwardly and above the height of said hollow stem.

13. The apparatus of claim 12, wherein said upper housing part connects with said lower housing part at a location above said hollow stem.

14. An apparatus for filtering and/or purifying water, comprising a housing, a filtration chamber formed in the housing, an inlet port through which water to be filtered and/or purified may flow into the filtration chamber, an outlet port through which water filtered and/or purified in the filtration chamber may flow from the filtration chamber, a matrix apparatus mounted in the filtration chamber for filtering and/or purifying water passing through the matrix apparatus, the matrix apparatus comprising a matrix having a first end portion and a second end portion, the matrix apparatus dividing the filtration chamber into two zones which comprise a first zone for receiving water to be filtered and/or purified entering the filtration chamber via the inlet port and a second zone for receiving water that has been filtered and/or purified by moving from the first zone into the second zone by passing through the matrix apparatus, the second zone of the filtration chamber being in fluid communication with the outlet port, and the matrix apparatus having an end cap secured to the second end portion of the matrix, the end cap having a disk portion, the disk portion of the end cap having a periphery, the end cap including shock absorbing means formed on the periphery of the disk portion of the end cap that project toward portions of the housing near the periphery of the disk portion of the end cap for absorbing shock to the matrix apparatus to guard against damage to the matrix if the apparatus for filtering and/or purifying water is dropped, wherein the shock absorbing means projecting toward portions of the housing includes resilient springy fingers that project radially away from the matrix along a plane containing the disk portion of the end cap and resilient springy fingers that extend outwardly from the disk portion of the end cap at an angle above the plane of the disk portion of the end cap.

15. A filtration device for filtering and/or purifying water, comprising a filtration member for filtering and/or purifying water, the filtration member having a first end portion, a second end portion, a cylindrically shaped portion extending from the first end portion to the second end portion, a center axis extending between the first end portion and the second end portion, and a channel extending through the filtration member along the center axis of the filtration member, the filtration member having an outer surface and an outer periphery, the outer surface of the filtration member having a crenellated structure, the outer surface of the filtration member extending only along the outer periphery of the filtration member, the entire outer surface of the filtration member facing substantially radially outwardly away from the center axis extending through the filtration member, the crenellated structure being formed by a plurality of ridges on the outer surface of the filtration member, the ridges extending between the first end portion of the filtration member and the second end portion of the filtration member, the outer periphery of the filtration member being configured such that a line extending outwardly away from any portion of the outer surface of the filtration member between the ridges at an angle that is substantially perpendicular to the outer surface of the filtration member at said portion does not intersect another portion of the outer surface of the filtration member, a first end cap secured to the first end portion of the filtration member, the first end cap having a disk portion and a hollow cylindrical center ring formed on the disk portion that extends into the channel extending through the filtration member, the center ring having an inner surface facing the center axis extending between the first end portion and the second end portion, and a resilient shock absorbing ring positioned in the channel extending through the filtration member and snugly mounted against the inner surface of the center ring, the resilient shock absorbing ring being adapted to fit snugly around and against a hollow stem forming an outlet port of an apparatus for filtering and/or purifying water, the resilient shock absorbing ring having an annular recess formed therein to increase shock absorbing ability of the resilient shock absorbing ring, the annular recess being located between the center ring of the first end cap and the channel extending through the filtration member, and the annular recess being closed off from flow of water from the channel extending through the filtration member.

16. The filtration device of claim 15, the filtration device having a second end cap secured to the second end portion of the filtration member, the second end cap having a disk portion, the disk portion of the second end cap having a periphery, and the second end cap including shock absorbing means formed on the periphery of the disk portion of the second end cap that are located above the filtration member and project radially away from the filtration member toward portions of a wall of a filtration chamber of an apparatus for filtering and/or purifying water containing the filtration member for absorbing shock to the filtration device to guard against damage to the filtration member if an apparatus for filtering and/or purifying water containing the filtration device is dropped, wherein the shock absorbing means includes resilient springy fingers that project radially away from the filtration member along a plane containing the disk portion of the second end cap and resilient springy fingers that extend outwardly from the disk portion of the second end cap at an angle above the plane of the disk portion of the second end cap.

17. An apparatus for filtering and/or purifying water, comprising a housing having a filtration chamber formed therein, the housing having a top wall and a bottom wall, an inlet port formed in the top wall of the housing through which water to be filtered and/or purified may flow into the filtration chamber, first water outlet means formed in the bottom wall of the housing for discharging water filtered and/or purified in the filtration chamber from the filtration chamber, a matrix apparatus mounted in the filtration chamber for filtering and/or purifying water passing through the matrix apparatus, the matrix apparatus comprising a cylindrical matrix having a first end portion, a second end portion, a cylindrically shaped portion extending from the first end portion of the matrix to the second end portion of the matrix, a center axis extending between the first end portion of the matrix and the second end portion of the matrix, and a channel extending through the matrix along the center axis of the matrix, the matrix having an outer surface and an outer periphery, the outer surface of the matrix having a crenellated structure, the outer surface of the matrix extending only along the outer periphery of the matrix, the entire outer surface of the matrix facing substantially radially outwardly away from the center axis extending through the matrix, the crenellated structure being formed by a plurality of ridges on the outer surface of the matrix, the ridges extending between the first end portion of the matrix and the second end portion of the matrix, the outer periphery of the matrix being configured such that a line extending outwardly away from a portion of the outer surface of the matrix between the ridges at an angle that is substantially perpendicular to the outer surface of the matrix at said portion does not intersect another portion of the outer surface of the matrix, the channel extending through the matrix being in fluid communication with the first outlet means, a pumping apparatus connected to the inlet port and to a stream, a river, or water from a tap, and dirt and debris removing means formed in the housing for removing dirt and debris that has settled on the outer surface of the matrix apparatus and/or between the outer surface of the matrix apparatus and the housing from the filtration chamber, when desired, without backwashing, said dirt and debris removing means including second water outlet means formed in the top wall of the housing for discharging from the filtration chamber without having to first flow through the matrix water that has entered into the filtration chamber from the inlet port and dirt and debris contained in the water resulting from the water flowing over the outer surface of the matrix apparatus and between the outer surface of the matrix apparatus and the housing to remove dirt and debris on the outer surface of the matrix apparatus and/or between the outer surface of the matrix apparatus and the housing, wherein the apparatus has opposite ends including a first end and a second end, wherein said first water outlet means is disposed on an end of the apparatus that is opposite to an end of the apparatus at which said second water outlet means is disposed.

18. The apparatus of claim 17, said dirt and debris removing means further including a removable cap that may be removed from the second water outlet means to open the second water outlet means.

* * * * *